United States Patent [19]

Schaaf

[11] Patent Number: 4,664,552
[45] Date of Patent: May 12, 1987

[54] EROSION CONTROL APPARATUS AND METHOD

[76] Inventor: Cecil Schaaf, 3015 Palmer Rd., Standish, Mich. 48658

[21] Appl. No.: 766,847

[22] Filed: Aug. 16, 1985

[51] Int. Cl.$^4$ .............................................. E02B 3/12
[52] U.S. Cl. ........................................ 405/20; 24/34;
52/DIG. 2; 403/316; 403/319; 404/40; 405/19
[58] Field of Search ...................... 405/16–20,
405/284, 287; 404/40, 41; 52/585, 589, 227,
590, 108, 663, DIG. 2, 660, 507, 509; 403/319,
324, 354; 248/74.1; 256/47, 48, 50, 53; 24/34,
38

[56] References Cited

U.S. PATENT DOCUMENTS

| | | | |
|---|---|---|---|
| 991,041 | 5/1911 | Toennes | 405/20 |
| 2,247,530 | 7/1941 | Thomas et al. | 52/663 |
| 2,706,664 | 4/1955 | Conrad | 403/316 X |
| 3,133,147 | 5/1964 | Auld et al. | 248/74.1 X |
| 3,233,893 | 2/1966 | Meyer | 404/40 X |
| 3,343,301 | 9/1967 | Adelman | 52/585 X |
| 3,387,825 | 6/1968 | Kreeger | 256/47 X |
| 3,474,626 | 10/1969 | Colle | 405/18 |
| 4,227,829 | 10/1980 | Landry | 405/20 |
| 4,260,296 | 4/1981 | Hilfiker | 405/287 X |
| 4,329,079 | 5/1982 | Milding | 403/319 |

FOREIGN PATENT DOCUMENTS

| | | | |
|---|---|---|---|
| 406387 | 5/1969 | Australia | 405/19 |
| 1328360 | 8/1973 | United Kingdom | 403/315 |
| 1552623 | 9/1979 | United Kingdom | 52/DIG. 2 |

Primary Examiner—Dennis L. Taylor
Attorney, Agent, or Firm—Cullen, Sloman, Cantor, Grauer, Scott & Rutherford

[57] ABSTRACT

An erosion control revetment and wall made from preformed blocks which are secured to elongate support members by interlocking sleeves. The block is formed with transversely extending slots which extend from the top end to the bottom end of the block and have an enlarged opening on the top end for receiving a tubular sleeve which encircles the elongate support members. The outer diameter of the sleeve is snugly received within the enlarged opening, but is larger than the width of the remainder of the slot, preventing unintended removal of the block from the support member. The elongate support members may be semi-rigid rods or cables. The revetment is formed from alternating rows of blocks which are offset by one elongate support member relative to blocks in adjacent rows. Alternatively, the blocks may be assembled into a wall having vertically aligned blocks or blocks which are offset relative to one another in adjacent rows.

4 Claims, 12 Drawing Figures

EROSION CONTROL APPARATUS AND METHOD

TECHNICAL FIELD

This invention relates to an erosion control apparatus made up of unique blocks interconnected by elongate support members and a method of assembling the blocks to the elongate support members to form an erosion mat or wall.

BACKGROUND

Revetments are placed on river banks and river bottoms or lake shorelines to prevent erosion of the riverbank or shore by the action of the water against the riverbank or shore. Sea walls are vertical structures for similarly protecting riverbanks or lake frontage by retaining the earth adjacent lakes or rivers to prevent erosion. Revetments and sea walls are well known but generally are difficult to install over irregular surfaces and are not sufficiently durable to withstand long term water action.

One type of revetment is disclosed in U.S. Pat. No. 4,227,829 to Landry wherein a flexible mat of cellular blocks are woven together by means of a nonabrasive plastic cable in two directions. The longitudinal cables are threaded through holes in cast cement blocks at a remote manufacturing location. The mats of cement blocks are then placed on a truck for delivery to an installation site and installed in sections by a crane fitted with a special weldment for installing each section. The Landry revetment requires a labor intensive stringing of cables through the blocks and installation of the extremely heavy preassembled mats by a crane with a special attachment for maintaining the mats in a spread position prior to installation.

Another approach to forming revetments is to interlock concrete blocks having interlocking elements which are assembled together on site. Interlocking concrete blocks rely primarily upon the weight of the block and the interlocking construction to hold the revetment in place. Interlocking concrete blocks are not well suited for covering an uneven surface and require that the surface be first leveled prior to installation of the interlocking blocks. The interlocking blocks also suffer from the disadvantage that they may be dislodged if ice forms on the surface of the water adjacent the revetment.

Prior revetment structures fail to provide a simple and effective method for assembling a revetment on site which is permanently interlocked, capable of withstanding long term water erosion and can not be dislodged by the formation of ice upon the revetment.

The present invention is directed to overcoming one or more of the problems set forth above.

SUMMARY OF THE INVENTION

In one aspect of the present invention a unique concrete block for forming an erosion control device is provided which has first and second slots formed in the back of the block which extend into the block to a slot base intermediate the face and back of the block. The slots extend from the bottom of the block to the top of the block and have a counterbore in one end having a diameter greater than the width of the slot and which extends longitudinally along the slot at the closed end of the slot. The blocks are designed to be affixed to elongate support members, rods or cables, by simply sliding the block laterally onto the elongate support member. The width of the slots is greater than the width of the rods. The blocks are then locked onto the elongate support member by means of a sleeve which has an outer diameter greater than the slot and which encircles the rod and is adapted to be received within the counterbore of the block. The block is used to form an erosion control device, by affixing a plurality of blocks to a plurality of rods by sliding the rods into the slots of the blocks wherein the blocks are moved perpendicular to the axis of the rods. Sleeves disposed about the rods are shifted along the length of the elongate support members and into the enlarged openings in the blocks to secure the blocks onto the rods. The sleeves prevent the rods from sliding out of the slots because the outer diameter of the sleeve is greater than the width of the slot except at the counterbore, or enlarged openings, where the sleeves are received.

The method of forming an erosion blanket or sea wall according to the present invention comprises the steps of positioning a plurality of elongate support members, rods or cables, parallel to one another on the riverbank or lakeshore to be protected. Sleeves are placed upon the rods prior to securing the blocks thereto. Blocks are fitted onto the rods by sliding the blocks laterally onto the rods through slots formed in the back of the block. After the blocks have been positioned on the rods they are locked in place by sliding the sleeves into an enlarged portion of the slot formed at a point intermediate the face and back of the block. The process of sliding the blocks onto the rods and sliding the sleeves into the enlarged portion of the slots is repeated until the erosion blanket is completed. The blocks may be staggered relative to one another in sequential rows for forming an erosion mat or aligned from row to row and vertically stacked to form a sea wall by using this same basic method. The unique method of mounting of the blocks on the rods permits installation on site by one man without special tools.

The blocks are preferably rounded on first and second ends to permit the apparatus to conform to surfaces which are contoured in the direction perpendicular to the direction that the rods extend. The sleeves may be used as spacers between blocks on adjacent rows to permit the erosion mat to more readily follow contoured surfaces.

When used as an erosion mat, the blocks are preferably staggered from one row to the next. On straight shorelines having minimal contour irregularities, all slots may be engaged with rods for maximum stability. On irregular surfaces and curving shorelines, only one slot per block may engage a rod, to increase the conformability of the mat to the supporting surface.

The unique block of the present invention is also useful as a sea wall wherein the blocks are attached to the rods as previously described in a direct stacking arrangement one on top of another from row to row. The sea wall may be anchored to similar blocks buried in the ground behind the sea wall which are attached to the sea wall by means of a tieback member.

Decorative walls may also be formed from the unique block of the present invention wherein the blocks are vertically stacked and staggered from row to row engaging alternate rods.

BRIEF DESCRIPTION OF THE DRAWINGS

FIG. 2 is a block diagram of the preferred method of assembling the blocks to the elongate support members.

DETAILED DESCRIPTION

Figure 1:
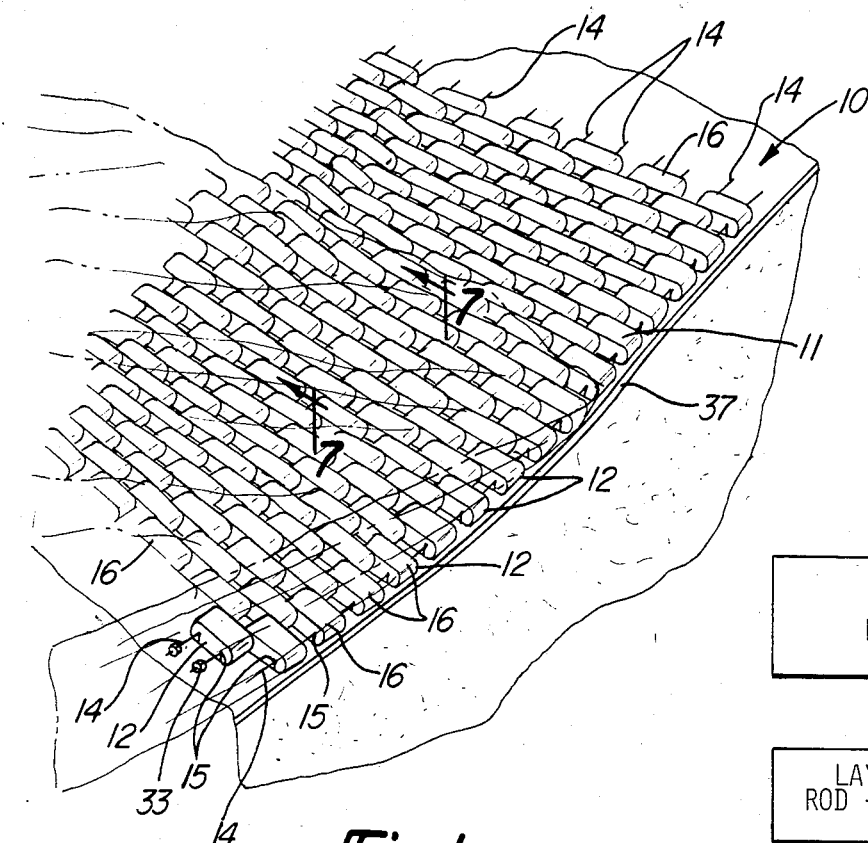
FIG. 1 is a perspective view showing the erosion control apparatus of the present invention in the revetment mat embodiment extending from below the water surface to the shore above the water level.

An erosion control apparatus 10 is shown in FIG. 1 to comprise an erosion mat 11 formed from a plurality of blocks 12 which are interconnected by longitudinally extending elongate support members 14. The blocks 12 are preferably concrete aggregate preforms specially configured for use in the present invention. The elongate support members 14 may be steel cables, plastic cables, rods formed of steel with a corrosion resistant coating, rods formed of a polymeric material, or other semi-rigid rods. The blocks 12 are secured to the rods 14 by means of sleeves 15 which are preferably formed of a polyvinyl chloride tubing. An exemplary block may be 4"×8"×16" and the rod may be one-half inch in diameter.

Figure 3:
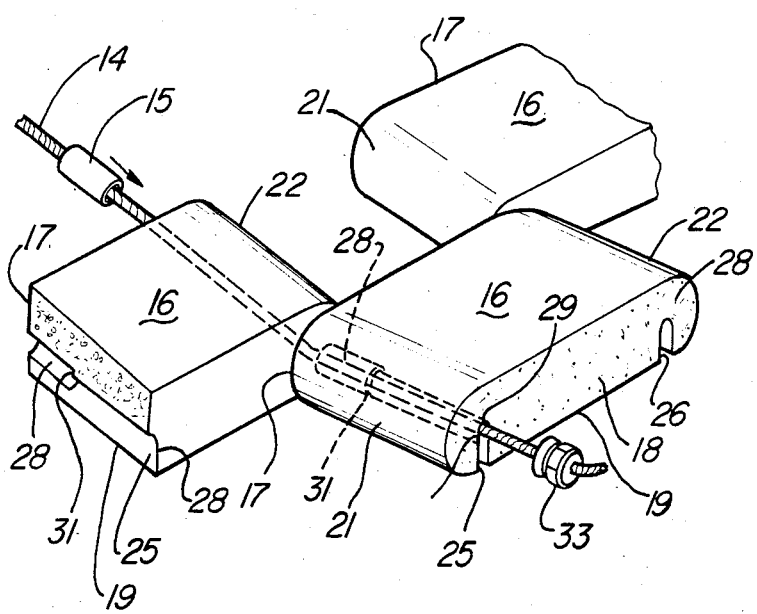
FIG. 3 is a perspective view of the erosion control apparatus partially assembled.
Figure 4:
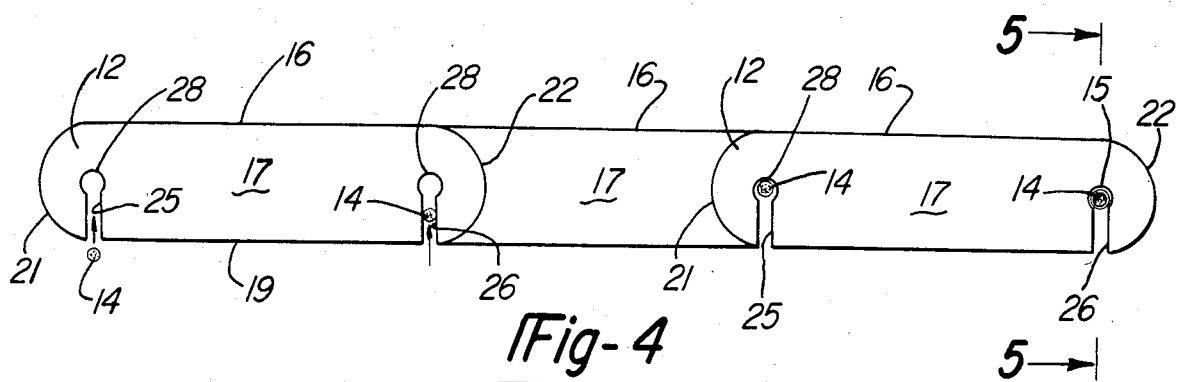
FIG. 4 is a plan view of the top of the blocks with the elongate support member being shown sequentially as it is assembled to the block.
Figure 5:
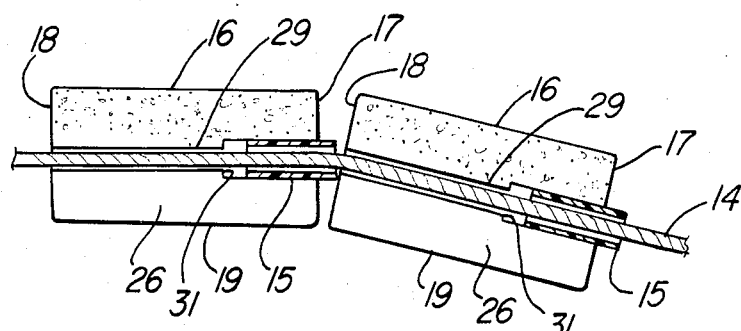
FIG. 5 is a section view taken along the line 5—5 in FIG. 4.
Figure 6:
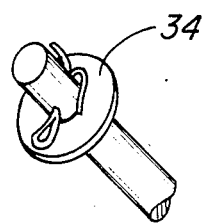
FIG. 6 is a fragmentary perspective view of the top end stop secured to the elongate support member.

The block 12 according to the present invention will be described in detail with reference to FIGS. 3, 4, and 5 of the drawings. The blocks 12 have a face 16 and top and bottom surfaces 17 and 18 preferably disposed at right angles to the face 16. A base 19 is disposed opposite the face 16 and preferably parallel thereto. First and second ends 21 and 22 are provided on opposite lateral ends of the block 12 and are preferably substantially cylindrical in shape to permit laterally adjacent blocks to follow contours of a supporting surface perpendicular to the length of the elongate support members without resulting in unwanted projections above the face of the assembled erosion mat 11. The block 12 includes first and second slots 25 and 26 in the base 19 which extend from the top 17 to the bottom 18 in a parallel spaced relation. The slots 25 and 26 have an enlarged opening, or counterbore 28, formed at the slot base or root 29. The enlarged opening 28 extends a predetermined distance from the top 17 to a counterbore base 31 and is substantially keyhole shaped when viewed from the top of the block. It is understood that the number of slots may be varied to suit a particular application without departing from the present invention.

The elongated support members 14, rods or cables, are preferably provided with a lower end stop 33 welded or otherwise secured to their lower end to prevent the blocks 12 from sliding off that end. An upper end stop 34 comprising a washer 35 and a cotter pin 36, or other suitable fastener, is provided at the top end of the elongate support member 14 to prevent removal of the blocks 12 from that end.

Figure 7:
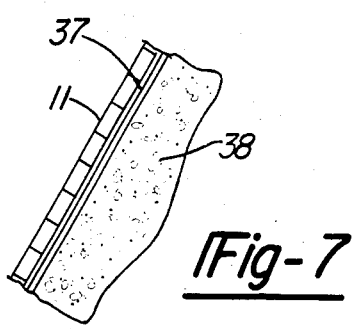
FIG. 7 is a fragmentary section taken along the line 7—7 in FIG. 1.

Referring now to FIG. 7, the erosion mat 11 is shown installed on an embankment. The erosion mat 11 is preferably installed over a filter cloth 37, or plywood barrier layer if required, to protect the embankment 38 which may be aggregate fill or the pre-existing shoreline.

The method of the present invention is explained with reference to FIG. 2 of the drawings. When assembled to form an erosion mat 11 the first step is to lay out the filter cloth 37, or other barrier layer, over the substrate to be protected. The rods are then laid out in the desired orientation with the lower end stops 33 secured thereto. The sleeves 15 are loosely preassembled to the rods 14. The sleeves may be temporarily secured in place by means of a clamp to prevent them from sliding down the rod as the block is being fitted on the cable. The next step is to fit the blocks on the rod by laterally sliding the rods 14 into the slots 25 and 26 formed in the back of the blocks as is shown in FIG. 4. After the rods are seated in the base or root 29 of the slots, one of the sleeves 15 on each of the rods 14 is moved down the rod and into the enlarged opening 28 to lock the rod into the block. This locking action results from the fact that the outer diameter of the sleeve is greater than the width of the slot, so that the sleeve-surrounded cable cannot slide back out of the slot.

If desired, the sleeve may be only partially inserted in the enlarged opening 28 to permit spacing of the blocks along the elongate support member 14. The greater the uninserted length of the sleeve, the greater the block-to-block spacing, and the greater the ability of the mat to bend and conform to a non-planar underlying contour. The steps of sliding the blocks onto the elongate support member and sliding the sleeves into the enlarged opening is repeated until the erosion blanket 11 is completed.

When forming an erosion mat 11 it is generally preferred to alternate the positioning of the blocks 12 on the rods 14 from row to row. This is accomplished, as shown in FIG. 3, by aligning adjacent blocks so that a given rod passes through slot 25 of one block and slot 26 of the blocks on each side of that block. Slot 26 of the first block would then receive a second rod which engaged slots 25 of a different pair of adjacent blocks. As shown in FIG. 1, that assembly technique results in all slots engaging a rod, and the entire assembly being interlocked together because each rod is connected to its adjacent rods by linking blocks.

Figure 12:
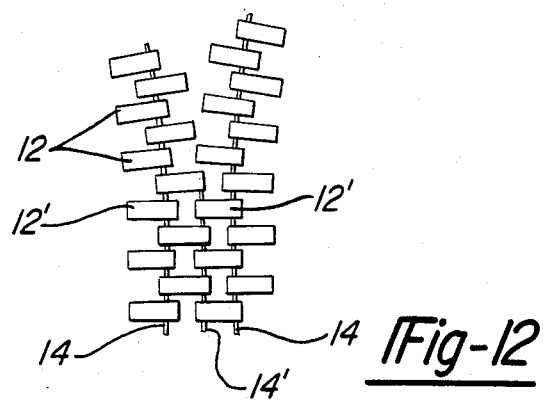
FIG. 12 is a fragmentary plan view of an erosion mat assembled in a modified manner.

An alternative assembly, particularly advantageous for curving shorelines, is shown in FIG. 12, which shows a fragmentary plan view of a mat. The lower part of the figure shows an assembly wherein all slots receive a rod. However, the block row containing blocks 12' marks a transition point above which the rods are bent laterally so that they fan outward to permit the mat to traverse a distance which is greater than at the lower portion of the figure, as on a convexly curved shoreline. Above the transition point, each block is connected to only one rod, and rod 14' has terminated.

A unique installation technique using the present invention is to assemble the erosion mat in the winter on the surface of an ice covered body of water. When the ice thaws, the erosion mat sinks to the bottom of the riverbank or lake. In this way assembly may be completed without working underwater.

It should be noted that the same method of assembling the unique block of the present invention may be used to form a decorative wall 39, or a sea wall 40, as will be described below.

Figure 8:
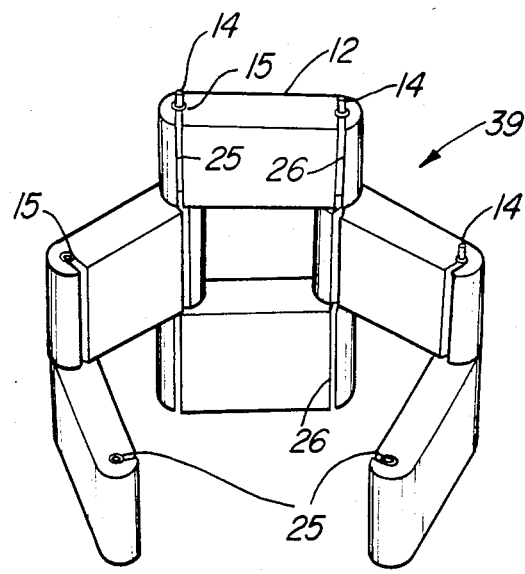
FIG. 8 is a decorative wall formed according to the present invention.

The decorative wall 39 is illustrated in FIG. 8 of the drawings and is formed in much the same manner as the erosion mat 11 but is stacked vertically instead of being laid upon the surface of the ground. The blocks 12 are assembled in alternating rows with rods 14 extending substantially vertically through alternate first and second slots 25 and 26. The sleeves 15 are used in the same manner as described above to lock the rods 14 into the blocks 12.

Figure 9:
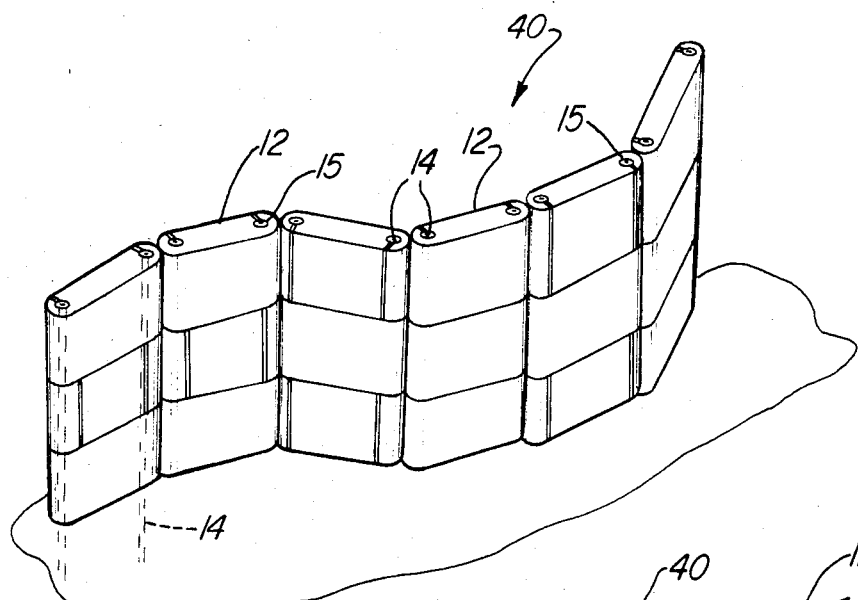
FIG. 9 is a perspective view of a sea wall made in accordance with the present invention.
Figure 10:
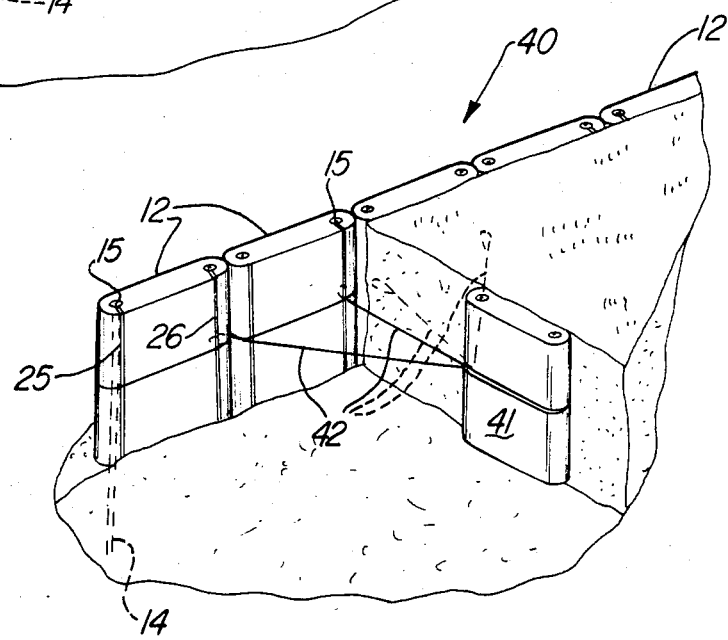
FIG. 10 is a perspective view of a sea wall showing the anchor and tieback.

The sea wall 40 is illustrated in FIGS. 9 and 10. The sea wall 40 may be configured to follow any shoreline shape. The sea wall 40 is assembled according to the same basic method of the present invention and preferably uses the same unique block 12. The sea wall 40 is vertically arranged and the rows of blocks 12 are vertically stacked without alternating from row to row. The blocks 12 are secured together by means of the rods 14 and the rods are locked in the blocks 12 by means of the sleeves 15, as previously described.

To provide additional support for the sea wall 40 a buried anchor wall 41, preferably comprising one or more of the blocks 12, is installed perpendicular to the blocks 12 of the sea wall 40 and secured thereto by means of a tie back 42. A series of anchors 41 may be provided along the length of the sea wall 40 at spaced locations. The anchor 41 may be a different type of block, a pylon or any other type of wall securing apparatus as is well known in the art. The tie backs 42 are preferably formed of high strength plastic and adapted to be retained by the rods between adjacent blocks 12.

Figure 11:
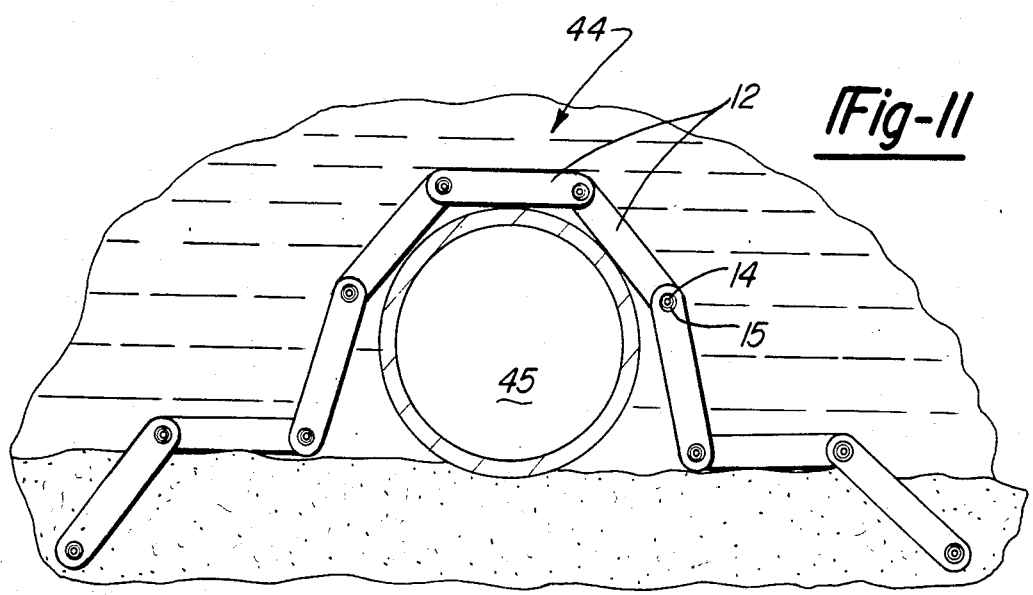
FIG. 11 is a cross sectional view of the present invention applied over an underwater pipeline.

Applicant's invention may also be employed as a pipeline guard 44, as shown in FIG. 11, wherein the elongate support members 14 extend parallel to the underwater pipeline 45. The blocks are assembled to the elongate support members 14 and secured by the sleeves 15. The end blocks of the pipeline guard 44 turn downwardly of their own weight to secure and anchor the pipe line guard 44 to the seabed.

The invention has been described above in conjunction with specific embodiments thereof, however it is understood that many alternatives, modifications, and variations will be apparent to those skilled in the art in light of the foregoing description. The method and apparatus of the present invention fully satisfies the objects, aims and advantages as set forth above. Accordingly, applicant's invention is intended to embrace all such alternatives, modifications, and variations that fall within the scope of the appended claims.

I claim:

1. An erosion control device comprising:
   a plurality of rigid blocks, each block having a face and base forming a first pair of opposed surfaces, a top and bottom forming a second pair of opposed surfaces and first and second opposed ends;
   each block having a pair of parallel slots extending the full length of said base from said top to said bottom and extending into said block from said base to a slot base located at a depth intermediate said base and said face, the spacing between said slots being constant throughout the full depth of said slots;
   at least a portion of the length of each slot having a width, measured transversely to said length, which is narrower at said block base than at said slot base;
   a plurality of elongated support members having a transverse width less than said width of said slots at said block base so that a support member is receivable in the slots of adjacent aligned blocks, each elongated support member having a plurality of sleeves thereon which surround said member and freely slide along the length thereof, each sleeve having an external transverse dimension which is greater than the width of said slots at said block base but which is receivable within the wider portion of said slots located at said slot base when inserted by being slid along the length of its associated support member;
   said device being held together by the reception of said elongated support members in said slots, each member extending through the aligned slots of a plurality of blocks to form a grid-like assembly, one of said sleeves being slid along the length of its associated member and into said wider portion of said slot of each block after insertion of said member therein, said sleeve-surrounding member being thereafter prevented from removal from said slots in a direction perpendicular to the length of said members by the inability of said sleeves to pass through the restricted width of said slots at said block base; and
   each block being pivotable about the axis of an elongated support member located within a slot of said block.

2. The device of claim 1 wherein the sleeve is dimensioned relative to the length of the slots so that only a portion of the length of the support member within the slot of a given block is surrounded by a sleeve, so that the unsleeved portion of the support member within the slot can be displaced throughout the depth of the slot.

3. A rigid block for use in an erosion control system comprising:
   a face and a base forming a first pair of opposed surfaces;
   a top and a bottom forrming a second pair of opposed surfaces;
   first and second opposed ends;
   a pair of parallel slots in said base extending the full length of said base from said top to said bottom surfaces and extending into said block from said block base to a slot base which is located at a depth intermediate said block base and said face;
   the spacing between said slots being constant throughout the full depth of said slots;
   a first portion of the length of each of said slots, commencing with said top surface of said block and extending toward said bottom surface of said block, having a width, measuring transversely to said length, which is narrower at said block base than at said slot base.

4. The block of claim 3 wherein said first portion of said slot length extends only to a shoulder located intermediate said top and bottom surfaces of said block, the width of said slot base in the balance of said slots from said shoulder to said bottom surface being less than the width of said slot base in said first portion of said slot.

* * * * *